US012785026B2

(12) United States Patent
Morris et al.

(10) Patent No.: US 12,785,026 B2
(45) Date of Patent: Nov. 3, 2026

(54) FIELD EMISSION X-RAY SOURCE AND SYSTEMS WITH DISTRIBUTED GETTERING

(71) Applicant: Varex Imaging Corporation, Salt Lake City, UT (US)

(72) Inventors: Thomas Anton Morris, Spanish Fork, UT (US); Dave Kirkham, South Jordan, UT (US); Travis Harding, West Point, UT (US)

(73) Assignee: VAREX IMAGING CORPORATION, Salt Lake City, UT (US)

( * ) Notice: Subject to any disclaimer, the term of this patent is extended or adjusted under 35 U.S.C. 154(b) by 137 days.

(21) Appl. No.: 18/751,683

(22) Filed: Jun. 24, 2024

(65) Prior Publication Data

US 2025/0391626 A1 Dec. 25, 2025

(51) Int. Cl.
*H01J 35/00* (2006.01)
*H01J 35/06* (2006.01)
*H01J 35/20* (2006.01)

(52) U.S. Cl.
CPC ............ *H01J 35/20* (2013.01); *H01J 35/065* (2013.01)

(58) Field of Classification Search
CPC ................................ H01J 35/065; H01J 35/20
See application file for complete search history.

(56) References Cited

U.S. PATENT DOCUMENTS

2011/0255664 A1* 10/2011 Ueda ...................... H01J 35/16
378/119

OTHER PUBLICATIONS

Paul Smith et al., Evaluation of the pumping performance of combinations of Ti—Zr—V—Hf alloy nonevaporable getter coatings with different morphologies, activation protocols controlled at cryogenic temperatures, J. Vac. Sci. Technol. B 42, 014202-1 to 014202-7 (Jan. 12, 2024) (8 pages).

* cited by examiner

*Primary Examiner* — Dani Fox
(74) *Attorney, Agent, or Firm* — Dorsey & Whitney LLP

(57) ABSTRACT

Embodiments include an x-ray source, comprising: a vacuum enclosure; one or more field emitters disposed along a line within the vacuum enclosure, each field emitter configured to generate an electron beam; an anode disposed within the vacuum enclosure and including a target configured to generate x-rays in response to the electron beams; and a getter extending along the line within the vacuum enclosure.

20 Claims, 7 Drawing Sheets

FIELD EMISSION X-RAY SOURCE AND SYSTEMS WITH DISTRIBUTED GETTERING

DESCRIPTION OF THE RELATED ART

X-ray tubes may include a getter to maintain a vacuum for stability and to function properly. Pill getters may provide localized gettering to capture molecules within the x-ray tube to maintain the vacuum.

DETAILED DESCRIPTION

Some embodiments include field emission x-ray sources with distributed gettering. Getters may be disposed within a vacuum enclosure such that a higher vacuum may be maintained, a more uniform vacuum may be maintained, and/or costs may be decreased. Various embodiments including field emission x-ray sources 100, such as field emission x-ray sources 100*a-e*, will be described below.

Figure 1:
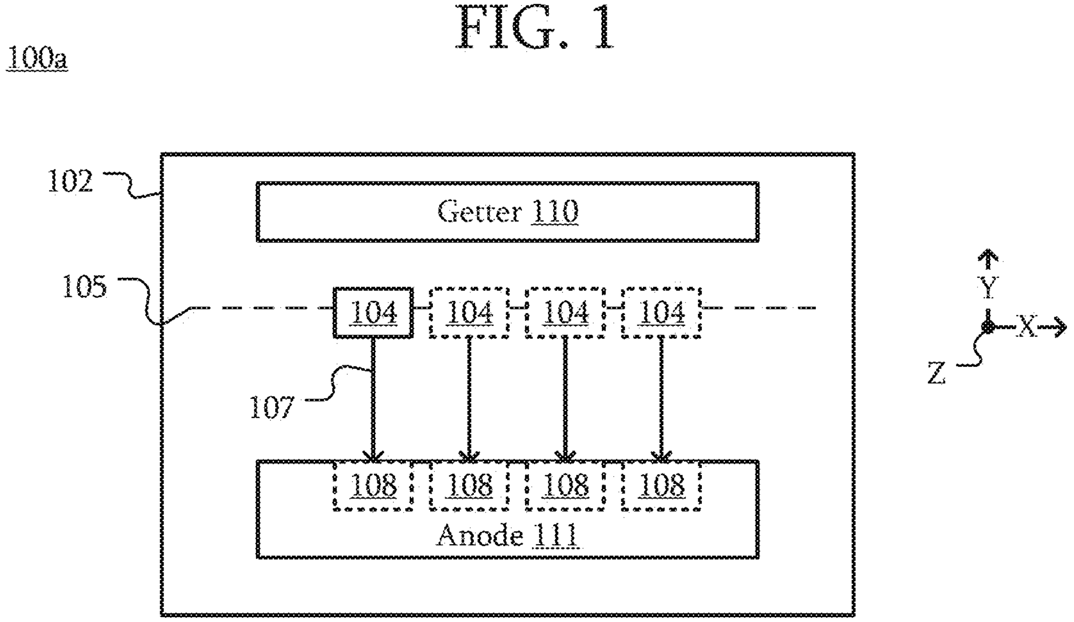
FIG. 1 is a block diagram of a field emission x-ray source according to some embodiments.

FIG. 1 is a block diagram of a field emission x-ray source according to some embodiments. A field emission x-ray source 100*a* includes a vacuum enclosure 102, multiple field emitters 104, an anode 111, and a getter 110. The field emitter(s) 104 and an anode 111 are disposed within the vacuum enclosure 102.

The vacuum enclosure 102 may include structures and components to maintain a relatively high vacuum. For example, the vacuum maintained may include from about 10-5 to 10-12 Torr or higher levels of vacuum. In some embodiments, the vacuum enclosure 102 may be configured to maintain an ultra-high vacuum of at least about 10-8 Torr, an extreme vacuum of at least about 10-11 Torr, or higher levels of vacuum.

One or more field emitters 104 may be disposed within the vacuum enclosure. Here a single field emitter 104 is illustrated with additional field emitters illustrated with dashed lines. The field emitters 104 may include Spindt emitters, carbon nanotube emitters, cold cathode emitters configured to generate electrons for x-ray generation, or the like. The field emitters 104 may be mounted on a structure within in the vacuum enclosure 102, mounted to a wall of the vacuum enclosure 102, or the like. Each of the field emitters 104 is configured to generate a corresponding electron beam 107.

The field emitters 104 are disposed along a line 105. The line 105 may be a straight line, a curved line, a circular arc, an elliptical arc, a parabolic arc, a piece-wise linear arc, a combination of such lines, or other forms. In this example, the line 105 is a straight line extending along the x-axis. The field emitters 104 are disposed in a line along the x-axis. In some embodiments, the field emitters 104 may be disposed to extend in part along the z-axis, such as in a circular or elliptical arc; however, the major axis of the field emitters 104 is along the line 105. When a single field emitter 104 is present, the single field emitter 104 may have the major axis disposed as described above. Multiple field emitters 104 will be referred to below for convenience; however, in other embodiments, a single field emitter 104 may be present.

Field emitters 104 may be more sensitive to vacuum levels. For example, an x-ray source without field emitters may operate with a vacuum level on the order of 10-7 to 10-8 Torr and maintain a sufficient reliability, lifetime, or the like. However, due to the structure of field emitters 104, an operating vacuum level may be an order of magnitude lower at about 10-8 to 10-9 Torr for similar reliability, lifetime, or the like.

The anode 111 is disposed within the vacuum enclosure 102. The anode 111 includes one or more targets 108 configured to generate x-rays in response to the electron beams 107. Each target 108 may include materials such as tungsten (W), molybdenum (Mo), rhodium (Rh), silver (Ag), rhenium (Re), palladium (Pd), or the like. In some embodiments, the electron beams 107 may be directed towards the same target 108. However, in other embodiments, each electron beam 107 may be directed towards a unique one of the targets 108. The field emitters 104, electron beams 107, and targets 108 may have a variety of other associations.

The getter 110 is a component configured to capture atoms or molecules (found in gasses). Capturing includes collecting, adsorbing, or absorbing atoms and molecules that can be found in gasses. The getters 106 may capture atoms or molecules within the vacuum enclosure 102. The atoms and molecules can be collected or adsorbed on the surface of the getter 110 or the atoms or molecules can be absorbed or diffused within the bulk material of the getter 110. The getter 110 may include a material such as tantalum, zirconium, titanium, aluminum, magnesium, thorium, alloys such as barium zirconia, titanium molybdenum, titanium salicides, or the like.

The getter 110 is disposed within the vacuum enclosure 102 to extend along the line 105 of the field emitters 104. The getter 110 may be offset from the line 105. The location of the getter 110 may distribute the gettering along the major axis of the field emitters 104. As described above, the line 105 corresponds with the major axis of the field emitters 104. As a result, the gettering may be distributed along the field emitters 104.

A vacuum level higher than 10-8 Torr may provide a desired stability for the field emission x-ray source 100 with field emitters 104 for a desired lifetime. Some getters may provide localized gettering that may increase a vacuum in a local area, but not sufficiently for all of the field emitters 104. By extending the getter 110 along the line 105, the gettering may be distributed along the field emitters 104. As a result, the vacuum around each field emitter 104 may be at or higher than a desired level. In addition, the field emitters 104 themselves may outgas during operation. The gettering may be used to keep the tube in the desired vacuum pressure.

In some embodiments, the getter 110 may extend further along the line 105 than the field emitters 104. In other embodiments, the field emitters 104 may extend further along the line 105 than the getter 110. In some embodiments, the getter 110 may extend along the line 105 at least 50% of the length of the field emitters 104 along the line 105.

In addition to the field emitters 104, the targets 108 may also outgas during use. In some embodiments, the field emitters 104 and targets 108 are a generally linear array and the gas loads may be along a generally linear distribution. To avoid localized higher gas for relatively brief time frames (localized transient responses) the gettering may be distributed along the relatively linear path.

Figure 2:
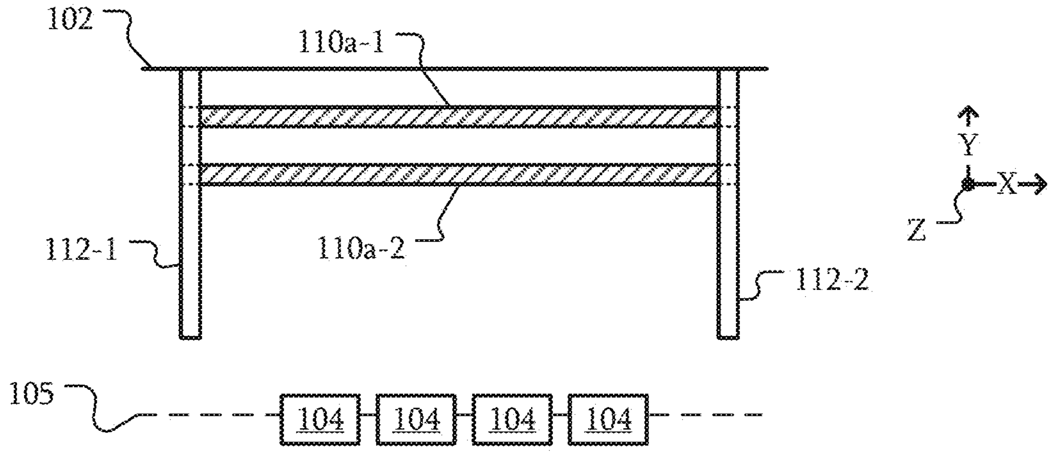
FIG. 2 is a block diagram of getters and a getter support of a field emission x-ray source according to some embodiments.

FIG. 2 is a block diagram of getters and a getter support of a field emission x-ray source according to some embodiments. In some embodiments, the getter 110 is a strip getter 110*a*. The field emission x-ray source 100 may include multiple strip getters 110*a*. Here, two strip getters 110*a*-1 and 110*a*-2 are used as an example; however, the number of strip getters 110*a* may be different. The strip getter 110*a* is a getter with a length along one axis that is greater than the dimension along other axes by a factor of two or more. In this example, the length along x-axis is greater than a length in either the y-axis or the z-axis.

Supports 112 are disposed within and attached to the vacuum enclosure 102. The supports 112 are configured to support the one or more strip getters 110*a*. The supports 112 may be configured to maintain the strip getters 110*a* separate from each other over a lifetime of the field emission x-ray source 100*a*. As a result, contact between the strip getters 110*a* may be reduced or eliminated over the lifetime, reducing particles that may contribute to arcing. In this example, a first support 112-1 and a second support 112-2 are attached to the vacuum enclosure 102. In other embodiments, the number of supports 112 may be different.

The strip getters 110*a* extend from the first support 112-1 to the second support 112-2. For each of the strip getters 110*a*, a first end of the strip getter 110*a* is attached to the first support 112-1 and a second end of the strip getter 110*a* is attached to the second support 112-2. The strip getters 110*a* may be attached to the supports 112 by welding, brazing, compression, or the like.

In some embodiments, the strip getters 110*a* are particularly applicable to field emission x-ray sources 100 such as the field emission x-ray source 100*a*. For example, some field emission x-ray sources 100 may include 10, 100, or more field emitters 104. Those field emitters 104 may be disposed in a line, along an arc, or other line 105 as described above. The number of field emitters 104 may result in a relatively long length in one direction such as the length along the line 105. This relative increase in length may increase a volume of the vacuum enclosure 102 and increase a length within the vacuum enclosure 102 over which a desired vacuum level is maintained. The getter 110, strip getters 110*a*, or the like extending along that line 105 may add gettering that is proportional to the increased length and distribute the gettering along the field emitters 104. In addition, as more field emitters 104 are added, increasing the length, the length of the strip getters 110*a* may be similarly increased.

Additional space may be needed for a strip getter 110*a* as compared to getters in other form factors, such as pill getters. Pill getters may have more surface area in a smaller volume than strip getters 110*a*. Strip getters 110*a* may have a higher risk of generating particulates. However, the strip getters 110*a* may result in a more uniform vacuum than pill getters. Strip getters 110*a* may be less expensive than other getters.

Although embodiments where the strip getters 110*a* are disposed along a linear line 105 has been used as an example, in other embodiments, the strip getters 110*a* may be disposed along an arc or other line 105 as described above. The strip getters 110*a* may be supported by the supports along the line 105 to create the desired arc, such as an arc matching that of the arc of the field emitters 104.

Figure 3:
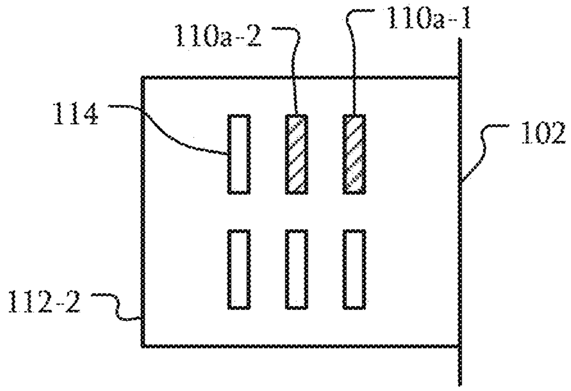
FIG. 3 is a side view of getters and a getter support of a field emission x-ray source of FIG. 2 according to some embodiments.

FIG. 3 is a side view of getters and a getter support of a field emission x-ray source of FIG. 2 according to some embodiments. In some embodiments, the supports 112 described with respect to FIG. 2 may be similar to the support 112-2 with multiple attachment locations 114. The support 112-2 may include a plate or other structure attached to the wall of the vacuum enclosure 102. The support 112-2 may be welded, brazed, or the like to the wall of the vacuum enclosure 102.

The attachment locations 114 may take a variety of forms. In some embodiments, the attachment locations 114 are openings with substantially the same cross-sectional shape as the strip getters 110*a* such that the strip getters 110*a* may be inserted into the openings. In other examples, the attachment locations 114 may include a protrusion, ledge or other structure extending from the plate of the support 112-2 to which the strip getters 110*a* may be attached. The strip getters 110*a* may be attached to the attachment locations 114 by welding, brazing, compression, or the like.

In some embodiments, a number of attachment locations 114 is greater than a number of the strip getters 110*a*. In this example, the support 112-2 includes six attachment locations 114 while two strip getters 110*a*-1 and 110*a*-2 are attached to the support 112-2. The ability to add or remove strip getters 110*a* allows the field emission x-ray source 100*a* to tuned to have a desired amount of gettering to achieve a desired vacuum level without adding additional unnecessary getters with the associated cost.

Moreover, x-ray sources with multiple pill getters may be welded, requiring multiple ports, multiple weld seams, extra complexity, and risk of leaks at the ports or weld seams. Each may need activation via a current source connected to the pill getter. Accordingly, multiple pill getters in an x-ray source may result in more time to manufacture, more time to process, higher costs, and more leak risk in comparison with embodiments described herein.

Figure 4:
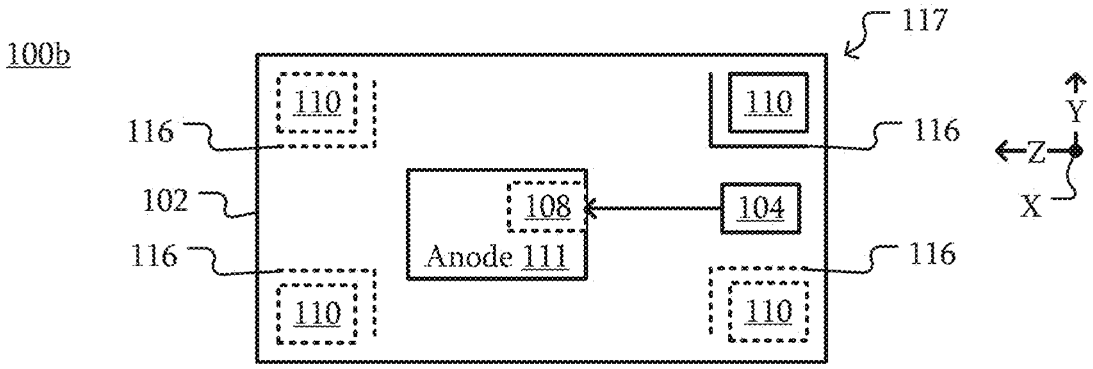
FIG. 4 is a block diagram of a field emission x-ray source with getters in corners according to some embodiments.

FIG. 4 is a block diagram of a field emission x-ray source with getters in corners according to some embodiments. The field emission x-ray source 100*b* may include elements similar to those described above, such as the field emitters 104, the anode 111, and one or more getters 110. A shield 116 disposed between the getter 110 and at least one of anode 111 and field emitters 104. The shield 116 may be electrically connected to a particular voltage potential, such as a ground, the vacuum enclosure 102, or the like. Accordingly, an electric field strength behind the shield 116 where the getter 110 is located may be reduced, reducing a chance of an arc on or near the getter 110.

In some embodiments, the getter 110 is disposed in a corner 117 of the vacuum enclosure 102. In this example, the getter 110 is disposed in a single corner 117 of the vacuum enclosure 102. Here, the getter 110 is disposed in a corner of the vacuum enclosure 102 on a side of the vacuum enclosure 102 adjacent to the to the field emitters 104. However, in other embodiments, the getter 110 may be disposed in other locations. For example, the getter 110 and the shield 116 may be disposed on a side of the vacuum enclosure 102 closest to the anode 111. Multiple getters 110 may be disposed in multiple corners 117. In some embodiments, the getters 110 may be disposed in a corner 117 that is furthest from the anode 111 and field emitters 104. This location may change based on the layout of the anode 111 and field emitters 104 and be different based on the different locations relative to the vacuum enclosure 102.

Figure 5A:
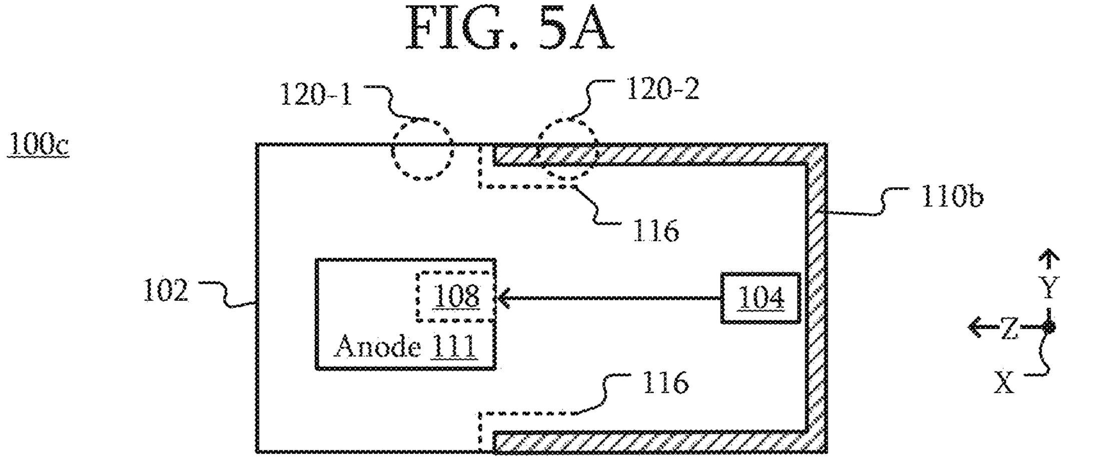
FIGS. 5A-B are block diagrams of a getter applied to a wall of a field emission x-ray source according to some embodiments.
Figure 5B:
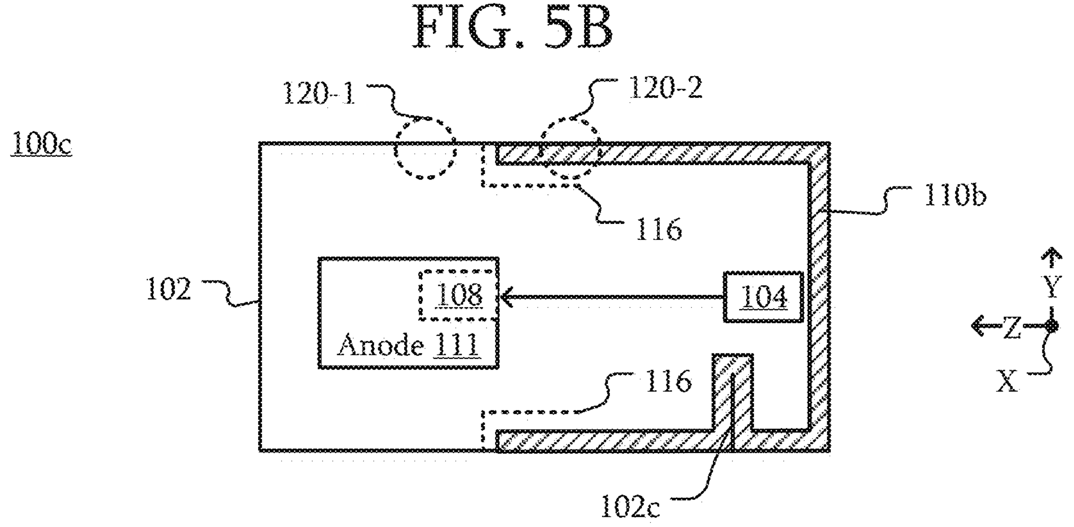

FIGS. 5A-B are block diagrams of a getter applied to a wall of a field emission x-ray source according to some embodiments. Referring to FIG. 5A, in some embodiments, a field emission x-ray source 100*c* includes elements similar to the field emission x-ray sources 100*a*, 100*b*, or the like as described herein. However, the field emission x-ray source 100*c* includes a getter 110*b* disposed in contact with a wall of the vacuum enclosure 102.

The getter 110*b* may be deposited on the wall of the vacuum enclosure 102. For example, the getter 110*b* may include material that is deposited by vapor deposition, sprayed on, or the like. The getter 110*b* may conform to a surface of the wall of the vacuum enclosure 102.

In some embodiments, less than all of the surface of the wall of the vacuum enclosure 102 may contact the getter 110*b*. Electric field strength during operation near some portions of the wall of the vacuum enclosure 102 may be relatively high. For example, in region 120-1 of the wall of the vacuum enclosure 102, the electric field strength may be higher than in region 120-2 of the wall of the vacuum enclosure 102. Accordingly, region 120-1 may not have the getter 110*b* applied to the wall while region 120-2 has the getter 110*b* applied to the wall. In some embodiments, a shield 116 may be attached to the vacuum enclosure 102. The shield 116 may be attached where the getter 110*b* is applied but also where the relative electric field strength may be higher. The shield 116 may reduce the relative electric field strength behind the shield 116 and near the getter 110*b*, reducing a chance of arcing.

In some embodiments, the field emission x-ray source 100*c* may be used in a stationary application. The field emission x-ray source 100*c* may be oriented such that any material released due to arcing may fall away from the field emitters 104. As a result, the field emission x-ray source 100*c* may tolerate some arcing as the particles may not be moving through regions of high electric fields.

In some embodiments, regions 120-1 where the getter 110*b* does not contact the wall of the vacuum enclosure 102 may be finished differently than in regions 120-2 where the getter 110*b* contacts the wall of the vacuum enclosure 102. For example, the wall of the vacuum enclosure 102 in region 120-1 may be polished, such as being polished to a mirror finish. The polishing may reduce a likelihood of an arc in that region 120-1. However, in regions such as region 120-2 where the getter 120*b* contacts the wall of the vacuum enclosure 102, the wall may not need the additional processing to create a mirror finish. That is, the wall of the vacuum enclosure 102 in region 120-2 may have a rougher surface, may not be polished, or the like as it was not further processed. In addition, the rougher surface may aid in the deposition of the getter 110*b*.

In some embodiments, the use of the getter 110*b* applied to the wall of the vacuum enclosure 102 may allow for different materials to be used for the vacuum enclosure 102. For example, the vacuum enclosure 102 may typically be formed of polished stainless steel. However, less expensive carbon steel, lighter aluminum, or the like may be used instead. In a particular example, carbon steel may be more difficult to process to achieve a desired finish if the wall is exposed. However, by coating the wall of a carbon steel vacuum enclosure 102, the finish is covered by the getter 110*b*.

In some field emission x-ray sources 100, the length of the vacuum enclosure 102 may be too short for a getter 110*b* to provide a sufficient amount of gettering. However, as the length of the vacuum enclosure 102 increases, specifically with larger arrays of field emitters 104, more surface area is available on the wall of the vacuum enclosure 102 for the getter 110*b*. As a result, a sufficient amount of gettering may be provided.

Referring to FIG. 5B, the field emission x-ray source 100*c* may be similar to that of FIG. 5A. However, the vacuum enclosure 102 may include a wall with one or more variation 102*c*. For example, the variations 102*c* may include waves, lines, protrusions, or the like. As a result, the surface area of the wall of the vacuum enclosure 102 and, consequently, the available area for the getter 110*b* may be increased.

Figure 6:
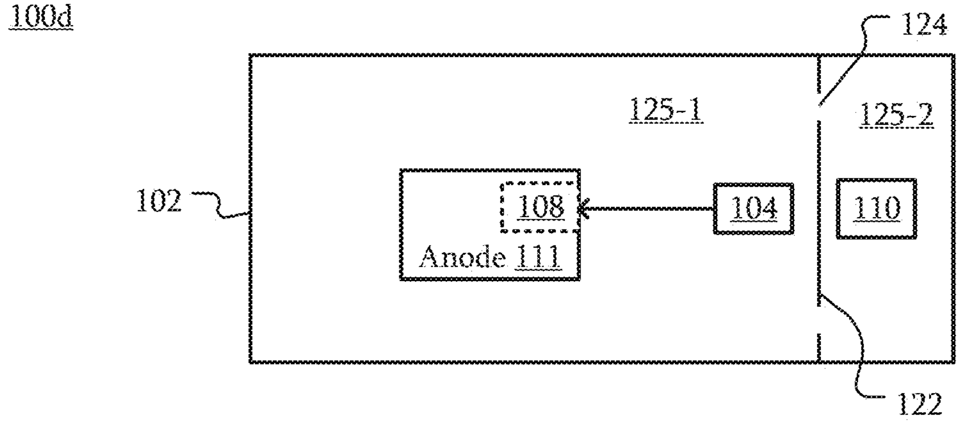
FIG. 6 is a block diagram of a field emission x-ray source with multiple chambers according to some embodiments.

FIG. 6 is a block diagram of a field emission x-ray source with multiple chambers according to some embodiments. In some embodiments, the field emission x-ray source 100*d* may be similar to the field emission x-ray sources 100*a*, 100*b*, 100*c*, or the like described herein. However, the vacuum enclosure 102 includes a first chamber 125-1 and a second chamber 125-2. The first chamber 125-1 is separated from the second chamber 125-2 by a wall 122 with at least one opening 124. The field emitters 104 and the anode 111 are disposed in the first chamber 125-1 and the getter 110 is disposed in the second chamber 125-2.

The configuration of the at least one opening 124 is based on the getter 110. In particular, the configuration of the opening 124 is based on decreasing a variation of vacuum levels across the field emitters 104. For example, with a series of pill getters 110, the vacuum levels may be higher closer to the pill getters 110 and drop further from the pill getters 110. Even with multiple pill getters 110, the vacuum may vary from higher closer to any one pill getter 110 and lower elsewhere. As a result, the vacuum level may vary across the field emitters 104. The openings 124 may be distributed so that the vacuum level variation is reduced.

Figure 7A:
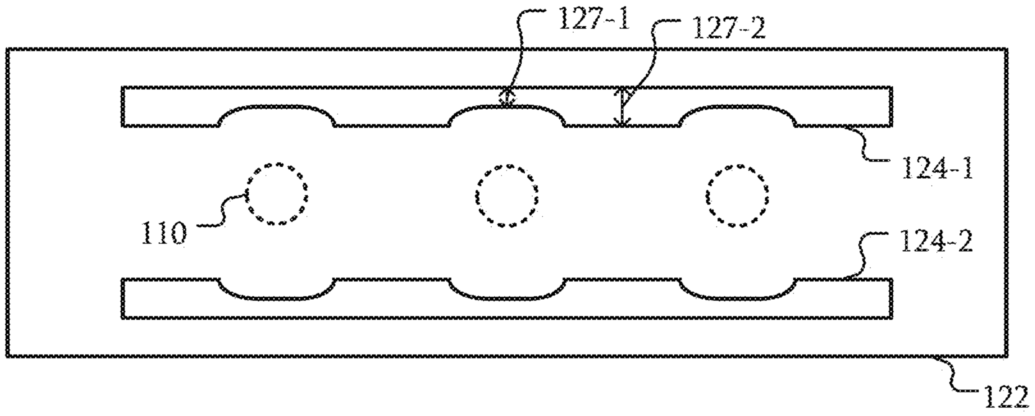
FIGS. 7A-C are block diagrams of a wall of a field emission x-ray source with separate chambers according to some embodiments.
Figure 7B:
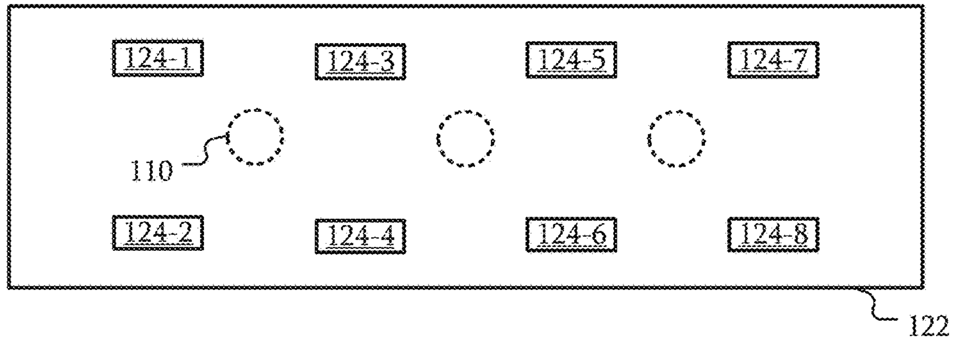
Figure 7C:
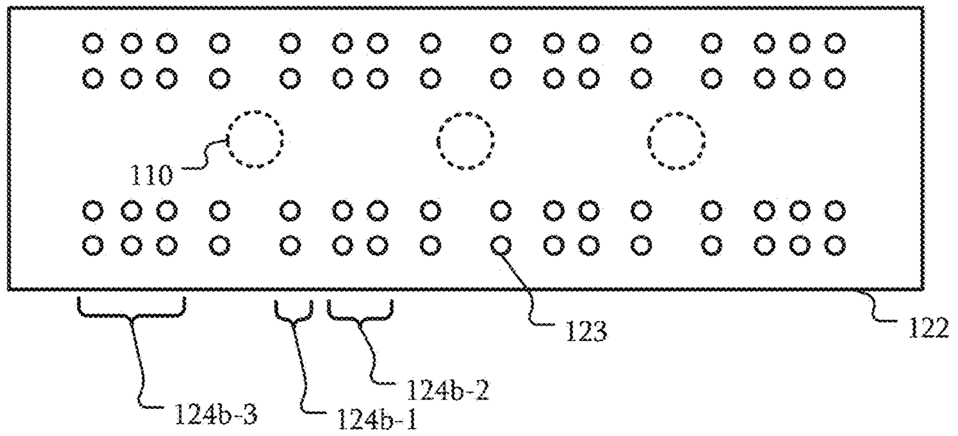

FIGS. 7A-C are block diagrams of a wall of a field emission x-ray source with separate chambers according to some embodiments. Referring to FIGS. 6 and 7A, in some embodiments, multiple getters 110 are disposed in the chamber 125-2 as illustrated by the dashed lines. The wall 122 includes openings 124-1 and 124-2. A width 127-1, 127-2 of the openings 124 vary based on the proximity to the getters 110. That is, the closer the opening is to a getter, the smaller the width 127-1 of the opening 124 as compared with the width 127-2 further from the getters 110. In some embodiments, the width 127-1 closer to the getters 110 may be smaller or zero. That is, the openings 124 may be closed in regions adjacent to the getters 110. At a location that is equidistant to adjacent getters 110, the width 127-2 of the openings 124 may be greater than the width closest to the getters 110.

Referring to FIGS. 6 and 7B, in some embodiments, the openings 124 may include multiple openings. Here eight openings 124-1 to 124-8 are illustrated as an example. However, other embodiments may have different number of openings.

Referring to FIGS. 6 and 7C, in some embodiments, the openings 124 may include multiple smaller openings 123.

The smaller openings 123 may be disposed in different groupings or distributions so that the density of the openings is different at different positions along the wall 122. For example, for group 124*b*-1 of smaller openings 123, the number of openings per unit area is less than the number of openings per unit area in both regions 124*b*-2 and 124*b*-3. The opening density in region 124*b*-3 may be greater than the opening density in region 124*b*-2. Region 124*b*-2 may be disposed between getters 110. Region 124*b*-3 may be disposed closer to one getter 110 at an edge of the wall 122.

Figure 8:
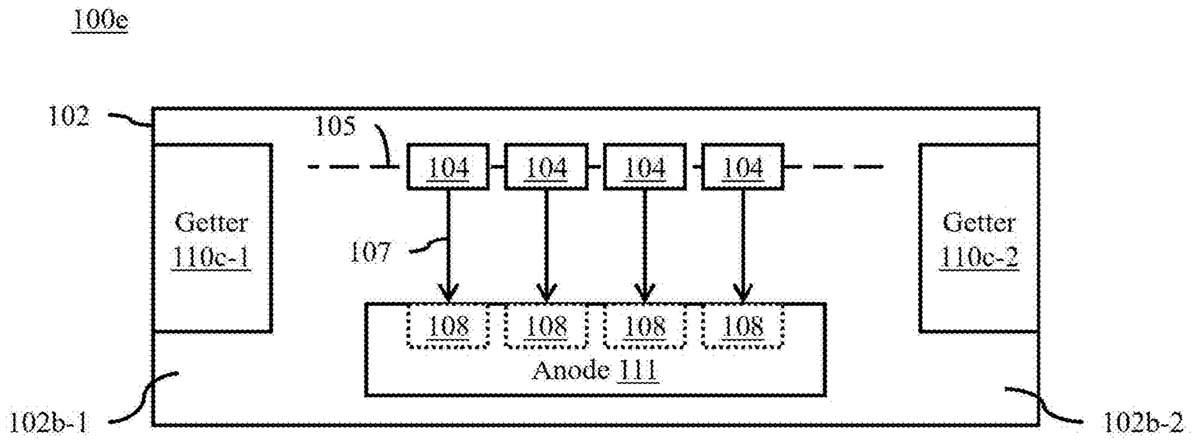
FIG. 8 is a block diagram of a field emission x-ray source with getters disposed at opposite ends according to some embodiments.

FIG. 8 is a block diagram of a field emission x-ray source with getters disposed at opposite ends according to some embodiments. In some embodiments, the field emission x-ray source 100*e* may be similar to the field emission x-ray sources 100*a*, 100*b*, 100*c*, 100*d*, or the like as described herein. However, in the field emission x-ray source 100*e*, the getters 110*c* are disposed at ends 102*b* of the vacuum enclosure 102. Here, the vacuum enclosure 102 includes a first end 102*b*-1 and a second end 102*b*-2. The first end 102*b*-1 and the second end 102*b*-2 are disposed at opposite ends of the line 105 within the vacuum enclosure 102. A first getter 110*c*-1 is disposed at the first end 102*b*-1 of the vacuum enclosure 102 and a second getter 110*c*-2 is disposed at the second end 102*b*-2 of the vacuum enclosure 102.

Figure 9A:
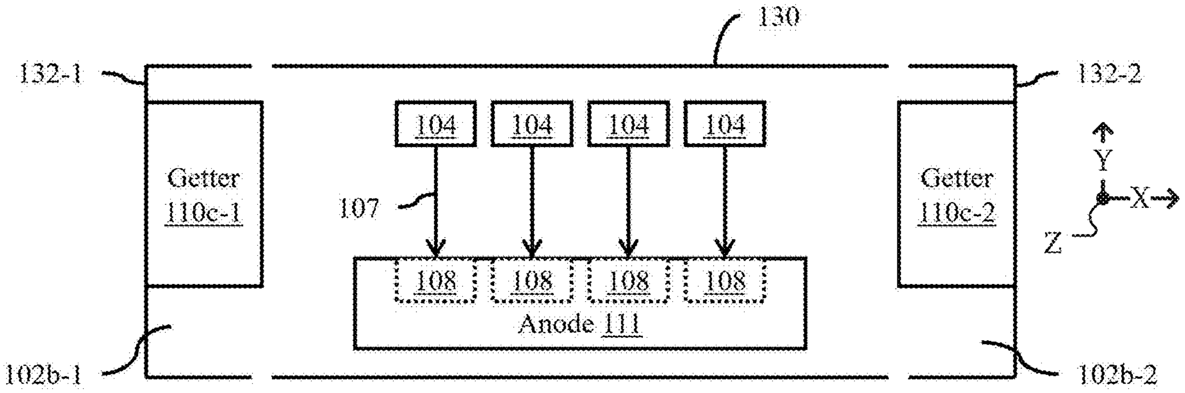
FIGS. 9A-9D are block diagrams of a field emission x-ray source with end caps according to some embodiments.

FIGS. 9A-9D are block diagrams of a field emission x-ray source with end caps according to some embodiments. Referring to FIGS. 8 and 9A, in some embodiments, the ends 102*b* of the vacuum enclosure 102 include end caps 132. In this example, end cap 132-1 is disposed at the first end 102*b*-1 and end cap 132-2 is disposed at the second end 102*b*-2.

The end caps 132 may be separate from the housing 130 of the vacuum enclosure. The end caps 132 may be attached to the housing 130 by welding, brazing, flanges, or the like. When the end caps 132 are sealed to the housing 130, the vacuum enclosure 102 may be formed. Additional components may be part of the vacuum enclosure 102 to create a sealed vacuum enclosure 102 beyond those illustrated, such as feedthroughs, windows, or the like.

The getters 110*c* may be mounted in the respective end caps 132. Mounting the getters 110*c* in the end caps 132 may reduce costs. The end caps 132 may be prepared with the getters 110*c* separately from the remaining components such as the anode 111 and the field emitters 104.

Figure 9B:
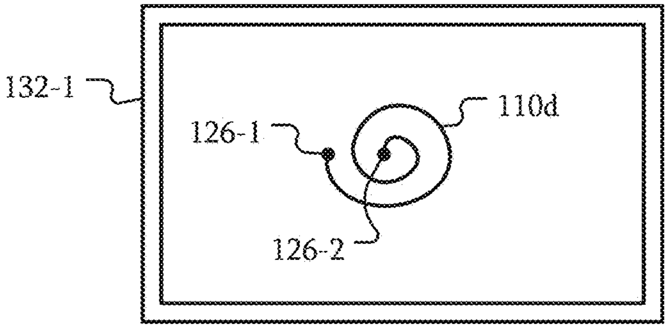

Referring to FIGS. 9A and 9B, in some embodiments, the getter 110*c* attached to the end cap 132-1 may be a strip getter in a coil 110*d*. The coil 110*d* may have spacing to separate the adjacent portions of the strip getter by a gap large enough to allow molecules to adsorb to the surface of the strip getter or otherwise be captured from the vacuum enclosure 102. For example, the gap may be about 1 mm to about 2 mm.

The coil 110*d* may be attached to the end cap 132-1 at ends 126 of the coil 110*d*. In some embodiments, the coil 110*d* may be welded to the end cap 132-1 at ends 126-1 and 126-2. Attachment at these locations may be sufficient to support the coil 110*d*.

The strip getters may be shipped in a coil. Mounting the strip getter as the coil 110*d* may reduce processing to straighten the strip getter. The coil 110*d* may be trimmed to a desired length without uncoiling the strip getter. In some embodiments, studs, posts, or the like may be attached to the ends 126 to be attached to the end cap 132-1.

Figure 9C:
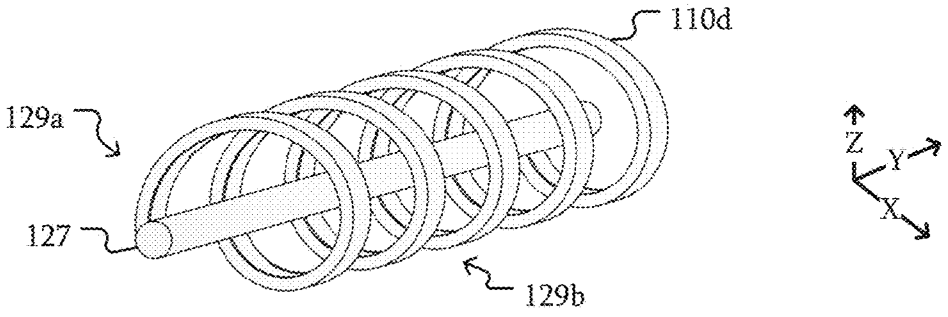

Referring to FIGS. 9A and 9C in some embodiments, a strip getter in a coil 110*d* (eg., a helix) may be mounted using a bar 127. The bar 127 may extend in a direction such as the Y direction. A central axis of the helix may extend in the Y direction. In this example, the coil 110*d* and bar 127 are illustrated with a particular orientation as an example. In other embodiments, the coil 110*d* and bar 127 may be oriented such that the bar 127 extends in the X direction, the Z direction, or a different direction. In some embodiments, the bar 127 is directly attached to an end cap 132. In other embodiments, the bar 127 may be attached to an end cap 132 through an intervening structure. In other embodiments, the bar 127 may be similarly attached directly or indirectly to the vacuum enclosure 102. The bar 127 may attach the coil 110*d* to the vacuum enclosure 102. For example, one side 129*a* of the coil 110*d* may be disposed between the bar 127 and the vacuum enclosure 102. The bar 127 may contact portions of the coil 110*d* on the side 129*a* and be further away from the side 129*b* of the coil 110*d*. The coil 110*d* may be held between the bar 127 and the vacuum enclosure 102. In some embodiments, the coil 110*d* may be relatively thin and difficult to weld. In some embodiments, using the bar 127 to hold the coil 110*d* may allow the coil 110*d* to be attached to the vacuum enclosure 102 without welding.

Figure 9D:
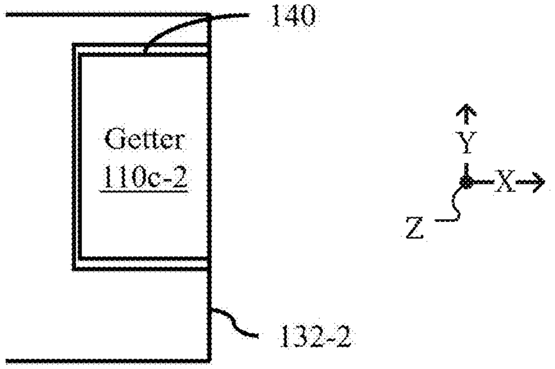

Referring to FIGS. 9A and 9D, in some embodiments, the getter 110*c* may be attached to the end cap 132-2 with a cage 140. The cage 140 may be welded to the end cap 132-2. As a result, the second getter 110*c*-2 may be attached to the end cap 132-2.

In some embodiments the coil 110*d* (eg., the helical coil getter) of FIG. 9C may be disposed within the cage 140 of FIG. 9D. In other embodiments, the coil 110*d* of FIG. 9C may be attached to the wall of the vacuum enclosure 102 as described with respect to FIGS. 4 and 8, or the like. In some embodiments, the coil 110*d* of FIG. 9C may be disposed behind a shield 116 as illustrated in FIG. 4.

Figure 10:
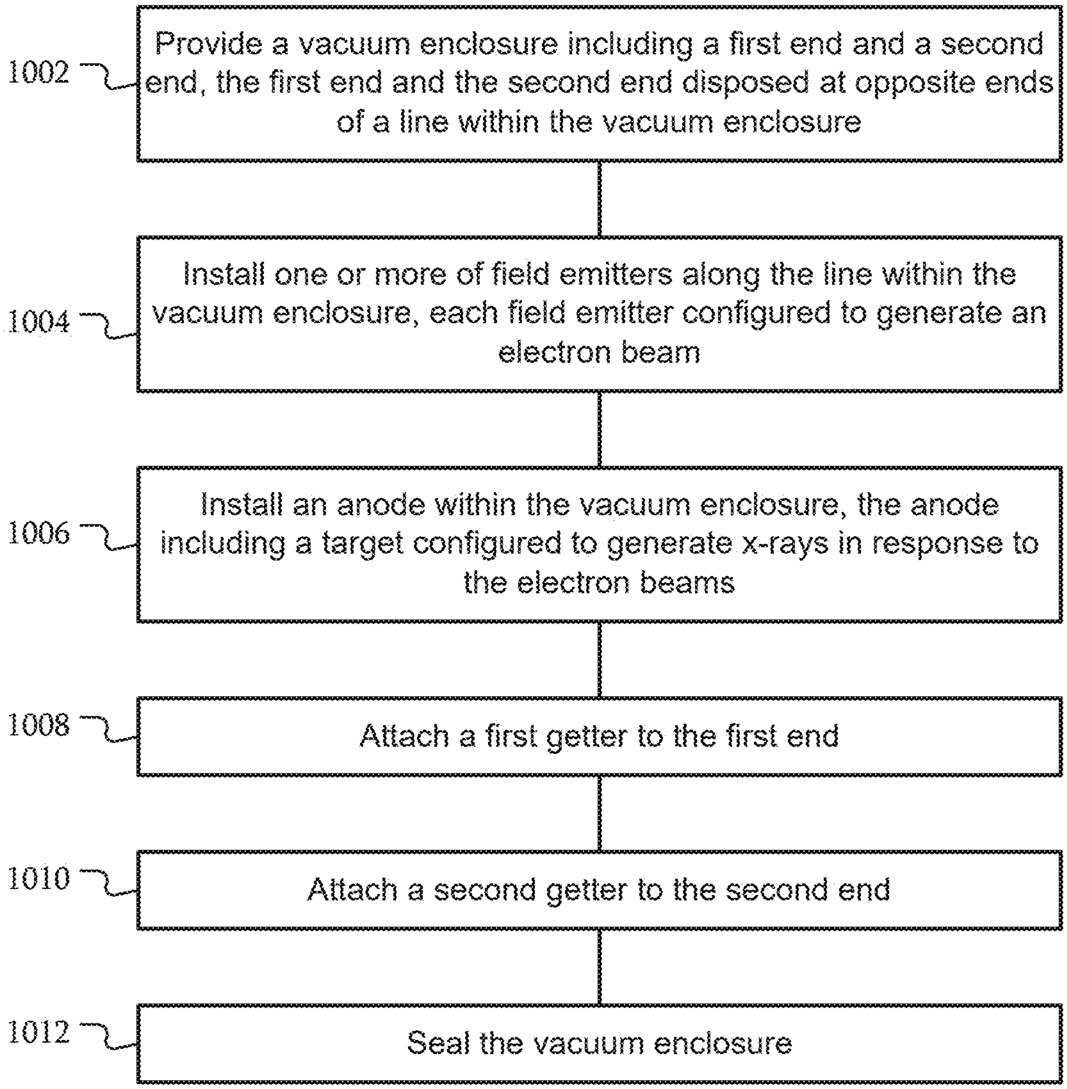
FIG. 10 is a flowchart of a technique of forming a field emission x-ray source according to some embodiments.

FIG. 10 is a flowchart of a technique of forming a field emission x-ray source according to some embodiments. Referring to FIGS. 8-10, the field emission x-ray source 110*e* will be used as an example.

In 1002, a vacuum enclosure 102 is provided including a first end 102*b*-1 and a second end 102*b*-2 when assembled. The first end 102*b*-1 and the second end 102*b*-2 are disposed at opposite ends of a line 105 within the vacuum enclosure 102. The vacuum enclosure 102 may be provided in an assembled state or a disassembled state. For example, the housing 130 and end caps 132-1 and 132-2 may be separate from each other.

In 1004, multiple field emitters 104 are installed along the line 105 within the vacuum enclosure 102. For example, the field emitters 104 may be attached to a support structure (not illustrated) and mounted to the housing 130.

In 1006, an anode 111 is installed within the vacuum enclosure 102. For example, an anode assembly (not illustrated) including the anode 111 may be attached to the housing 130.

In 1008, a first getter 110*c*-1 is attached to the first end 102*b*-1. In 1010, a second getter 110*c*-2 is attached to the second end 102*b*-2. For example, a getter 110*b* may be coated on some to all of a surface of the end caps 132-1 and 132-2. In another example, a coil 110*d* (e.g., a coil getter) may be attached to the end caps 132-1 and 132-2 as described above.

In 1012, the vacuum enclosure 102 is sealed. For example, the end caps 132-1 and 132-2 may be attached to the housing 130. The sealing may include attaching other structures, vacuum pumps, or the like such that a vacuum may be established in the vacuum enclosure 102. Once sealed, various operations such as a bakeout operation, an evacuation operation, a getter activation operation, a pinch-off operation, or the like may be performed.

Figure 11:
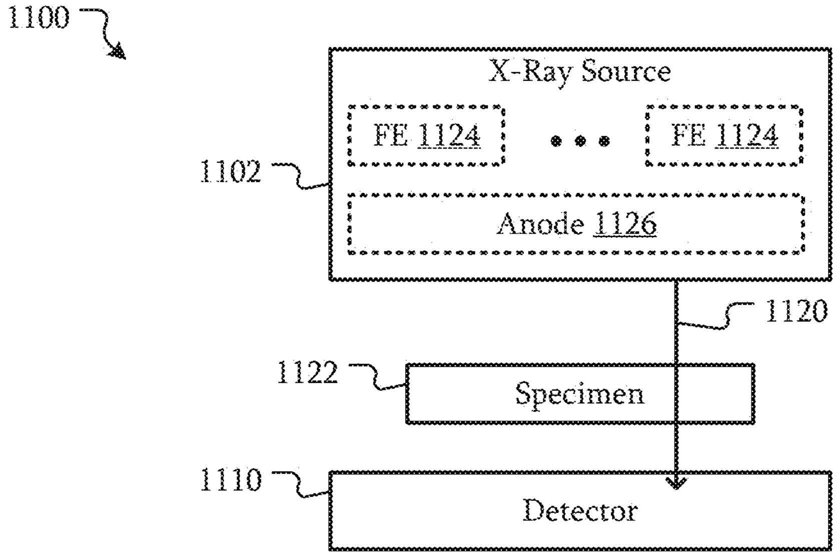
FIG. 11 is a block diagram of an x-ray imaging system according to some embodiments.

FIG. 11 is a block diagram of an x-ray imaging system with multiple detector locations according to some embodiments. The x-ray imaging system 1100 includes an x-ray source 1102 and detector 1110. The x-ray source 1102 may include a field emission x-ray source 100, such as field emission x-ray sources 100*a-e*, or the like as described above. In some embodiments, the x-ray source 1102 includes multiple field emitters (FE) 1124. Electron beams from the field emitters 1124 may be directed towards an anode 1126 to generate x-rays 1120. The x-ray source 1102 is disposed relative to the detector 1110 such that x-rays 1120 may be generated to pass through a specimen 1122 and detected by the detector 1110. In some embodiments, the detector 1110 is part of a medical imaging system. In other embodiments, the x-ray imaging system 1100 may include a portable vehicle scanning system as part of a cargo scanning system. The x-ray imaging system 1100 may be any system that may include an x-ray source and x-ray detector.

Some embodiments include a field emission x-ray source 100, 100*a-e*, comprising: a vacuum enclosure 102; one or more field emitters 104 disposed along a line within the vacuum enclosure 102, each field emitter 104 configured to generate an electron beam; an anode 111 disposed within the vacuum enclosure 102 and including a target 108 configured to generate x-rays in response to the electron beams; and a getter 110, 110*a-b* extending along the line within the vacuum enclosure 102.

In some embodiments, the getter 110, 110*a-b* comprises a strip getter 110, 110*a-b* extending along the line.

In some embodiments, the field emission x-ray source 100, 100*a-e* further comprises a first support 112 attached to the vacuum enclosure 102; and a second support 112 attached to the vacuum enclosure 102; wherein: the getter 110, 110*a-b* is one of a plurality of strip getters 110, 110*a-b*; each strip getter 110, 110*a-b* extends along the line within the vacuum enclosure 102; and for each of the strip getters 110, 110*a-b*, a first end of the strip getter 110, 110*a-b* is attached to the first support 112 and a second end of the strip getter 110, 110*a-b* is attached to the second support 112.

In some embodiments, each of the first support 112 and the second support 112 includes a number of strip getter 110, 110*a-b* attachment locations 114; and the number of strip getter 110, 110*a-b* attachment locations 114 is greater than a number of the strip getters 110, 110*a-b*.

In some embodiments, the field emission x-ray source 100, 100*a-e* further comprises a shield 116 disposed between the getter 110, 110*a-b* and at least one of the anode 111 and the one or more field emitters 104.

In some embodiments, the getter 110, 110*a-b* is disposed in a corner of the vacuum enclosure 102.

In some embodiments, the getter 110, 110*a-b* is disposed in contact with a wall of the vacuum enclosure 102.

In some embodiments, the getter 110, 110*a-b* is disposed in contact with less than all of the wall of the vacuum enclosure 102.

In some embodiments, a first region of the vacuum enclosure 102 has a first electric field strength during operation; a second region of the vacuum enclosure 102 has a second electric field strength that is greater than the first electric field strength; and regions of the wall of the vacuum enclosure 102 where the getter 110, 110*a-b* is not in contact with the wall of the vacuum enclosure 102 are closer to the second region of the vacuum enclosure 102 than regions of the wall of the vacuum enclosure 102 where the getter 110, 110*a-b* is in contact with the wall of the vacuum enclosure 102.

In some embodiments, a surface of the wall contacting the getter 110, 110*a-b* is not polished.

In some embodiments, the vacuum enclosure 102 includes a first chamber 125-1 and a second chamber 125-2; the first chamber 125-1 is separated from the second chamber 125-2 by a wall 122 with at least one opening 124; the one or more field emitters 104 and the anode 111 are disposed in the first chamber 125-1; the getter 110, 110*a-b* is disposed in the second chamber 125-2; and a configuration of the at least one opening 124 is based on the getter 110, 110*a-b*.

In some embodiments, the getter 110, 110*a-b* is one of a plurality of getters 110, 110*a-b* disposed in the second chamber 125; and a width of the at least one opening 124 closest to a first getter 110, 110*a-b* of the getters 110, 110*a-b* is less than a width of the at least one opening 124 at a location equidistant between the first getter 110, 110*a-b* and a second getter 110, 110*a-b* adjacent to the first getter 110, 110*a-b*.

In some embodiments, the getter 110, 110*a-b* is one of a plurality of getters 110, 110*a-b* disposed in the second chamber 125; and an opening 124 density of the at least one opening 124 closest to a first getter 110, 110*a-b* of the getters 110, 110*a-b* is less than an opening 124 density at a location equidistant between the first getter 110, 110*a-b* and a second getter 110, 110*a-b* adjacent to the first getter 110, 110*a-b*.

Some embodiments include a field emission x-ray source 100, 100*a-e*, comprising: a vacuum enclosure 102; one or more field emitters 104 disposed along a line within the vacuum enclosure 102, each field emitter 104 configured to generate an electron beam; an anode 111 disposed within the vacuum enclosure 102 and including a target 108 configured to generate x-rays in response to the electron beams; a plurality of getters 110, 110*a-b*; wherein: the vacuum enclosure 102 includes at a first end and a second end; the first end and the second end are disposed at opposite ends of the line within the vacuum enclosure 102; a first getter 110, 110*a-b* of the getters 110, 110*a-b* is disposed at the first end of the vacuum enclosure 102; and a second getter 110, 110*a-b* of the getters 110, 110*a-b* is disposed at the second end of the vacuum enclosure 102.

In some embodiments, the vacuum enclosure 102 includes a first end cap, a second end cap, and a housing; the first getter 110, 110*a-b* is disposed on the first end cap; and the second getter 110, 110*a-b* is disposed on the second end cap.

In some embodiments, at least one of the getters 110, 110*a-b* is a strip getter 110, 110*a-b* disposed in a coil 110*d*.

In some embodiments, at least one of the getters is a strip getter disposed in a helix.

Some embodiments include a method, comprising: providing a vacuum enclosure 102 housing including a first end and a second end, the first end and the second end disposed at opposite ends of a line within the vacuum enclosure 102 housing; installing one or more field emitters 104 along the line within the vacuum enclosure 102 housing, each field emitter 104 configured to generate an electron beam; installing an anode 111 within the vacuum enclosure 102 housing, the anode 111 including a target 108 configured to generate x-rays in response to the electron beams; attaching a first getter 110, 110*a-b* to the first end of the vacuum enclosure 102; attaching a second getter 110, 110*a-b* to the second end of the vacuum enclosure 102; and sealing the vacuum enclosure 102 housing, first end, and second end to form the vacuum enclosure 102.

In some embodiments, attaching the first getter 110, 110*a*-*b* to the first end of the vacuum enclosure 102 comprises attaching a coil 110*d* getter 110, 110*a*-*b* to the first end of the vacuum enclosure 102.

In some embodiments, attaching the coil 110*d* getter 110, 110*a*-*b* to the first end of the vacuum enclosure 102 comprises attaching a first end of the coil 110*d* getter 110, 110*a*-*b* to the first end of the vacuum enclosure 102 and attaching a second end of the coil 110*d* getter 110, 110*a*-*b* to the first end of the vacuum enclosure 102.

In some embodiments, attaching the coil 110*d* getter 110, 110*a*-*b* to the first end of the vacuum enclosure 102 comprises attaching a cage to the first end over the coil 110*d* getter 110, 110*a*-*b*.

Although the structures, devices, methods, and systems have been described in accordance with particular embodiments, one of ordinary skill in the art will readily recognize that many variations to the particular embodiments are possible, and any variations should therefore be considered to be within the spirit and scope disclosed herein. Accordingly, many modifications may be made by one of ordinary skill in the art without departing from the spirit and scope of the appended claims.

The claims following this written disclosure are hereby expressly incorporated into the present written disclosure, with each claim standing on its own as a separate embodiment. This disclosure includes all permutations of the independent claims with their dependent claims. Moreover, additional embodiments capable of derivation from the independent and dependent claims that follow are also expressly incorporated into the present written description. These additional embodiments are determined by replacing the dependency of a given dependent claim with the phrase "any of the claims beginning with claim [x] and ending with the claim that immediately precedes this one," where the bracketed term "[x]" is replaced with the number of the most recently recited independent claim. For example, for the first claim set that begins with independent claim 1, claim 4 can depend from either of claims 1 and 3, with these separate dependencies yielding two distinct embodiments; claim 5 can depend from any one of claim 1, 3, or 4, with these separate dependencies yielding three distinct embodiments; claim 6 can depend from any one of claim 1, 3, 4, or 5, with these separate dependencies yielding four distinct embodiments; and so on.

Recitation in the claims of the term "first" with respect to a feature or element does not necessarily imply the existence of a second or additional such feature or element. Elements specifically recited in means-plus-function format, if any, are intended to be construed to cover the corresponding structure, material, or acts described herein and equivalents thereof in accordance with 35 U.S.C. § 112(f). Embodiments of the invention in which an exclusive property or privilege is claimed are defined as follows.

The invention claimed is:

1. An x-ray source, comprising:
- a vacuum enclosure;
- a plurality of field emitters disposed along a line within the vacuum enclosure, each of the field emitters configured to generate an electron beam;
- an anode disposed within the vacuum enclosure and including a target configured to generate x-rays in response to the electron beams; and
- a getter extending along the line within the vacuum enclosure, wherein:
- the line has a first length between the field emitters;
- a second length of the getter extends continuously at least 50% of the first length; and
- a surface of a wall contacting the getter is unpolished.

2. The x-ray source of claim 1, wherein:
- the getter comprises a strip getter extending along the line.

3. The x-ray source of claim 1, further comprising:
- a first support attached to the vacuum enclosure; and
- a second support attached to the vacuum enclosure;

wherein:
- the getter is one of a plurality of strip getters;
- each of the plurality of strip getters extends along the line within the vacuum enclosure; and
- for each of the strip getters, a first end of the strip getter is attached to the first support and a second end of the strip getter is attached to the second support.

4. The x-ray source of claim 3, wherein:
- each of the first support and the second support includes a number of strip getter attachment locations; and
- the number of strip getter attachment locations is greater than a number of the strip getters.

5. The x-ray source of claim 1, further comprising:
- a shield disposed between the getter and at least one of the anode or the field emitters.

6. The x-ray source of claim 1, wherein:
- the getter is disposed in a corner of the vacuum enclosure.

7. The x-ray source of claim 1, wherein:
- the getter contacts a first portion of a surface of a wall of the vacuum enclosure; and
- a second portion of the surface of the wall of the vacuum enclosure is free from contacting the getter.

8. The x-ray source of claim 7, wherein:
- a first region of the vacuum enclosure has a first electric field strength during operation;
- a second region of the vacuum enclosure has a second electric field strength that is greater than the first electric field strength; and
- regions of the wall of the vacuum enclosure where the getter is not in contact with the wall of the vacuum enclosure are closer to the second region of the vacuum enclosure than regions of the wall of the vacuum enclosure where the getter is in contact with the wall of the vacuum enclosure.

9. The x-ray source of claim 1, wherein:
- the vacuum enclosure includes a first chamber and a second chamber;
- the first chamber is separated from the second chamber by a wall with at least one opening;
- the field emitters and the anode are disposed in the first chamber;
- the getter is disposed in the second chamber; and
- a configuration of the at least one opening is based on the getter.

10. The x-ray source of claim 9, wherein:
- the getter is one of a plurality of getters disposed in the second chamber; and
- a first width of the at least one opening closest to a first getter of the getters is less than a second width of the at least one opening at a location equidistant between the first getter and a second getter adjacent to the first getter.

11. The x-ray source of claim 9, wherein:
- the getter is one of a plurality of getters disposed in the second chamber; and a first opening density of the at least one opening closest to a first getter of the plurality of getters is less than a second opening density at a location equidistant between the first getter and a second getter of the plurality of getters adjacent to the first getter.

12. An x-ray source, comprising:

a vacuum enclosure;

one or more field emitters disposed along a line within the vacuum enclosure, each field emitter configured to generate an electron beam;

an anode disposed within the vacuum enclosure and including a target configured to generate x-rays in response to the electron beams;

a plurality of getters;

wherein:

the vacuum enclosure includes at a first end and a second end;

the first end and the second end are disposed at opposite ends of the line within the vacuum enclosure;

a first getter of the getters is disposed at the first end of the vacuum enclosure;

a second getter of the getters is disposed at the second end of the vacuum enclosure; and the first getter and the second getter comprise coatings on surfaces defining the vacuum enclosure.

13. The x-ray source of claim 12, wherein:

the vacuum enclosure includes a first end cap, a second end cap, and a housing;

the first getter is disposed on the first end cap; and the second getter is disposed on the second end cap.

14. The x-ray source of claim 12, wherein:

at least one of the getters is a strip getter disposed in a coil.

15. The x-ray source of claim 12, wherein:

at least one of the getters is a strip getter disposed in a helix.

16. A method, comprising:

providing a vacuum enclosure housing including a first end and a second end, the first end and the second end disposed at opposite ends of a line within the vacuum enclosure housing;

installing one or more field emitters along the line within the vacuum enclosure housing, each field emitter configured to generate an electron beam;

installing an anode within the vacuum enclosure housing, the anode including a target configured to generate x-rays in response to the electron beams;

attaching a first getter to a first surface of the vacuum enclosure housing at the first end of the vacuum enclosure housing by welding, brazing, first studs or posts attached to opposite ends of the first getter, a first bar extending through the first getter, or a first cage;

attaching a second getter to a second surface of the vacuum enclosure housing at the second end of the vacuum enclosure housing by welding, brazing, second studs or posts attached to opposite ends of the second getter, a second bar extending through the second getter, or a second cage; and sealing the vacuum enclosure housing, the first end, and the second end to form a vacuum enclosure, the first surface and the second surface at least partially defining the vacuum enclosure.

17. The method of claim 16, wherein:

attaching the first getter to the first end of the vacuum enclosure housing comprises attaching a coil getter to the first end of the vacuum enclosure housing.

18. The method of claim 17, wherein:

attaching the coil getter to the first end of the vacuum enclosure housing comprises attaching a first end of the coil getter to the first end of the vacuum enclosure housing and attaching a second end of the coil getter to the first end of the vacuum enclosure housing.

19. The method of claim 17, wherein:

attaching the coil getter to the first end of the vacuum enclosure housing comprises attaching a cage to the first end over the coil getter.

20. The x-ray source of claim 1, wherein:

a first portion of a surface of the wall contacting the getter has a first surface finish; and a second portion of the surface of the wall free from contacting the getter has a second surface finish different from the first surface finish.

* * * * *